UNITED STATES PATENT OFFICE.

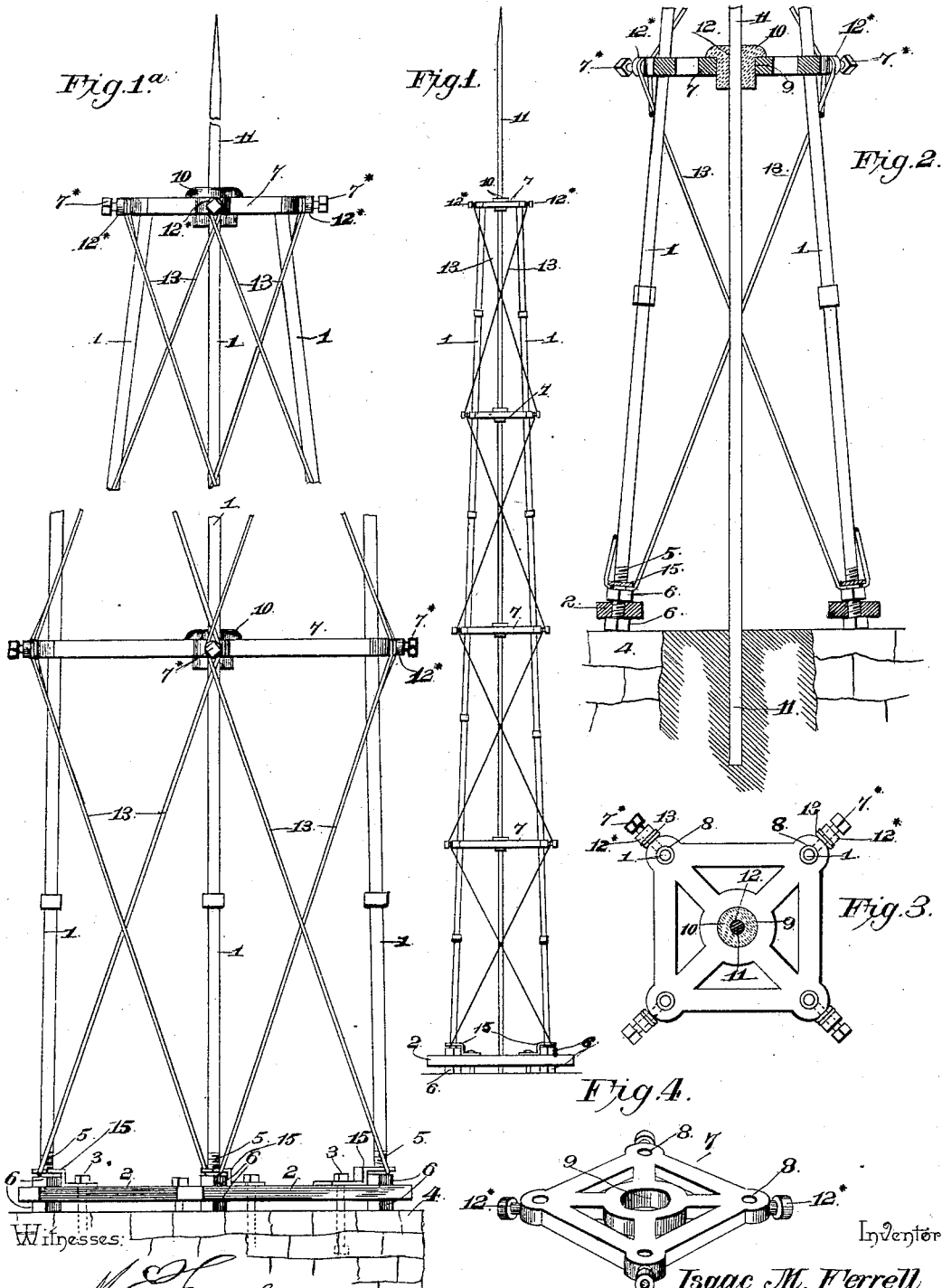

ISAAC M. FERRELL, OF STONE CREEK, OHIO.

LIGHTNING-ROD TOWER.

SPECIFICATION forming part of Letters Patent No. 433,459, dated August 5, 1890.

Application filed April 24, 1890. Serial No. 349,342. (No model.)

*To all whom it may concern:*

Be it known that I, ISAAC M. FERRELL, a citizen of the United States, residing at Stone Creek, in the county of Tuscarawas and State of Ohio, have invented a new and useful Lightning-Rod Tower, of which the following is a specification.

This invention has relation to towers adapted for the support of lightning-rods.

The object of the invention is to provide a suitable tower designed to be located adjacent to a cluster of houses or buildings, especially in open countries, which tower is adapted for the support of a lightning-rod designed to attract the electric fluid away from the buildings and conduct said fluid successfully into the earth.

Various other objects and advantages of the invention will hereinafter appear, and the novel features thereof will be particularly pointed out in the claims.

Referring to the drawings, Figure 1 is a side elevation of a tower constructed in accordance with my invention. Fig. 1ᵃ is a similar view of the upper and lower ends of the tower enlarged. Fig. 2 is a vertical section of the lower part of the tower. Fig. 3 is a transverse section. Fig. 4 is a detail in perspective of one of the connecting-plates.

Like numerals of reference indicate like parts in all the figures of the drawings.

The tower consists of four vertical rods 1, preferably formed of gas-pipe and joined together at intervals by suitable couplings. The upper ends of the rods converge, and their lower ends rest upon opposite sills 2, of iron, which sills are bolted, as at 3, to a preferably stone foundation 4. The lower ends of the rods are threaded, as at 5, and each end is provided with a pair of taps 6, one arranged at each side of the iron sills, as shown, so that the tower may be adjusted at any of its corners or sides so as to be vertically disposed and plumb. At the upper ends of the rods 1 and at intervals below the same are located connecting-plates 7, formed of metal and rectangular in shape. The plates 7 are provided at their four angles or corners with openings 8, through which the rods 1 pass, and are connected thereto by set-screws 7*, and have a central opening 9, in which is mounted a glass insulating-bushing 10, having a central opening 12, the several bushings being in vertical alignment with each other, and through said bushings is passed the lightning rod or conductor 11. The rod or conductor 11 has its lower end inserted in the damp earth, and its upper end is sharpened or tapered and either polished or tinned to prevent rusting. The connecting-plates, at their four corners outside of the rods, are provided with notched or headed lugs or cleats 12*, and said plates are connected by means of a series of opposite and diagonally disposed brace-wires 13. The brace-wires 13, of which there are eight in number, are first connected at their upper ends to the notched heads or cleats of the upper plate, there being two brace-wires to each cleat, after which said wires are disposed diagonally and in a downward direction to the cleats at the same side of and diagonally below the upper plate. This interlacing of the wire braces is continued throughout the height of the tower, after which the lower ends of the wire braces are connected to small plates 15, located upon the lower ends of the rods 1. In this manner an exceedingly strong, light, and durable tower is provided, and as the point of the conductor is located at a greater altitude than any of the surrounding buildings any lightning striking in that vicinity will be attracted to the rod and conducted by the same to the ground. The glass insulating-bushings mounted in the connecting-plates prevent the fluid from passing off into the frame-work of the tower. By the above invention it is apparent that a group of buildings or houses may be successfully protected against lightning and in a more efficient way than by the ordinary individual conductor, in that the latter attracts the lightning toward the house and is oftentimes insufficient to carry off the same.

Having thus described my invention, what I claim is—

1. The herein-described tower, consisting of the vertical supporting-rods connected at intervals and at their upper ends by the rectangular connecting-plates provided with openings for the passage of the rods and with a central aligning-opening having a bushing formed of glass or other non-conducting material, and the lightning rod or conductor mounted in said bushings, substantially as specified.

2. The herein-described tower, comprising the four vertical supporting-rods 1, connected at their upper ends and at intervals throughout their lengths by metallic plates, said plates being of rectangular shape and provided at their angles with openings for the passage of the rods and outside of said angles with notched heads or cleats and at their centers with openings, glass bushings mounted in the openings and a rod passing through the same and terminating at a point above the tower, and pairs of wire braces connected to each of the cleats of the upper plate and disposed in a zigzag course over the cleats of the succeeding plates at alternate sides thereof, substantially as specified.

3. The combination, with the vertical rods threaded at their lower ends, the opposite sills having openings through which the rods are passed, the nuts upon the rods at each side of the sills, and the stone base to which the sills are bolted, of the series of rod-connecting plates, said plates being connected by a series of diagonally-disposed brace-wires and provided at their centers with openings having bushings, and the lightning-conductor mounted in the central openings and having its lower end resting in the ground and its upper end extended beyond the tower, substantially as specified.

In testimony that I claim the foregoing as my own I have hereto affixed my signature in presence of two witnesses.

ISAAC M. FERRELL.

Witnesses:
DANIEL GRUBER,
EMANUEL HUMRIGHOUSE.